US006614859B2

(12) United States Patent
Lay

(10) Patent No.: US 6,614,859 B2
(45) Date of Patent: *Sep. 2, 2003

(54) METHOD AND SYSTEM FOR ANGLE OF ARRIVAL ESTIMATION AND DATA DETECTION USING VECTOR PER-SURVIVOR PROCESSING OF SIGNALS FROM AN ARRAY OF ANTENNAS

(75) Inventor: Norman E. Lay, Glendora, CA (US)

(73) Assignee: TrellisWare Technologies, Inc., Poway, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/084,615

(22) Filed: May 26, 1998

(65) Prior Publication Data

US 2002/0122472 A1 Sep. 5, 2002

Related U.S. Application Data

(60) Provisional application No. 60/047,681, filed on May 27, 1997.

(51) Int. Cl.$^7$ ................................................. H04D 1/00
(52) U.S. Cl. ....................................... 375/341; 375/316
(58) Field of Search .............................. 375/316, 340, 375/343, 324, 349, 148, 152, 341, 262; 714/796; 342/156, 378

(56) References Cited

U.S. PATENT DOCUMENTS

| | | | | |
|---|---|---|---|---|
| 5,218,359 A | * | 6/1993 | Minamisono | ................ 342/383 |
| 5,227,803 A | * | 7/1993 | O'Connor et al. | .......... 342/442 |
| 5,432,821 A | * | 7/1995 | Polydoros et al. | .......... 375/340 |
| 6,101,399 A | * | 8/2000 | Raleigh et al. | ............. 455/561 |

* cited by examiner

Primary Examiner—Tesfaldet Bocure
Assistant Examiner—Kevin M. Burd
(74) Attorney, Agent, or Firm—Townsend and Townsend and Crew LLP

(57) ABSTRACT

A method and a system are provided which uses vector per-survivor processing (PSP) on the outputs of an array of antennas of arbitrary geometry to jointly estimate angles of arrival of multipath components of the transmitted data sequence (i.e., the modulated data signal) while extracting an estimate of the modulated data. The system includes an antenna array of arbitrary geometry (i.e., arbitrary spacing between elements, directional, omnidirectional, etc.), each element of which has its output applied to a corresponding matched filter. The matched filter outputs in turn are sampled and applied to a vector-type PSP engine, wherein the vector PSP engine computes an estimate of the channels between the transmitter antenna and the receiver antenna elements to construct a channel estimation matrix. Angle of arrival estimates of each of the multipath components are extracted from the channel estimation matrix for the best survivor. An estimate of the transmitted data sequence is also extracted based on the best survivor. The PSP engine performs its function in the form of equations that solve for the vector estimates of complex channels, where the channel models include multipath angles of arrival.

10 Claims, 4 Drawing Sheets

METHOD AND SYSTEM FOR ANGLE OF ARRIVAL ESTIMATION AND DATA DETECTION USING VECTOR PER-SURVIVOR PROCESSING OF SIGNALS FROM AN ARRAY OF ANTENNAS

CROSS-REFERENCE TO RELATED APPLICATION

This application claims the benefit of provisional patent application Ser. No. 60/047,681 filed May 27, 1997 entitled MODULATION CLASSIFICATION AND DATA DETECTION OF SIGNALS IN UNKNOWN ISI ENVIRONMENTS by Norman E. Lay, the content of which is incorporated herein by reference.

BACKGROUND OF THE INVENTION

This invention relates to wireless communication and in particular to environments characterized by multipath interference. More particularly, this invention relates to improvements over conventional adaptive array processing of signals in the presence of multipath.

Traditional approaches to adaptive processing of signals received through an antenna array are typically constrained by the number of antenna elements. For example, the number of beams or nulls formed cannot exceed the number of elements. The components required to derive the amplitude and phase information for array processing increase proportionately with the increase in the number of antenna elements. In addition many conventional adaptive array processing algorithms use matrix inversion and manipulation which requires expensive high power processing. Traditionally, the direction of the intended user (IU) or source of interference to be canceled must be acquired before a beam or null can be steered in that direction. This requires either complex processing over time (which may not account for the system dynamics) or relaxing the benefits of beamforming by using wider beams or sweeping a narrow beam for acquisition. Invariably such acquisition necessitates a difficult compromise between performance and complexity (i.e. cost).

Beamforming and nulling approaches suffer inherent potential performance reductions. If a null is steered in a particular direction, for example, all energy in that direction is normally canceled in conventional approaches to adaptive array processing. Portions of the intended user signal could thus be lost if it comes from such a direction. (One scenario where this can be easily seen is the case where the multipath from the intended user signal source reflects from an object in the same general direction as the intended user—a very likely scenario in an urban environment—making it impossible to null the multipath signal without impacting the main intended user signal). Even if the intended user signal does not come from the same direction as the interference, the sidelobes and backlobes resulting from any real-world beamforming implementation may degrade the intended user signal by allowing interference through these lobes or by canceling part of the intended signal where the angle of the source of the intended signal is too close to the angular position of a null placed on an interfering signal. Furthermore, since beamforming and nulling merely optimize only power reception in a preselected direction, no benefit can be derived from other signal parameters (e.g., phase or frequency).

The general field of adaptive array processing is described in the standard text by Bernard Widrow and Samuel D. Stearns, *Adaptive Signal Processing,* published by Prentice-Hall in 1985.

The principle of Per-Survivor Processing (PSP) is known for scalar signal processing. PSP provides a general framework for the approximation of likelihood-based data detection (search) algorithms whenever the presence of unknown quantities prevents the precise use of the classical Viterbi Algorithm (VA).

Prior work of Andreas Polydoros and Riccardo Raheli in scalar Per-Survivor Processing (PSP), as is described in U.S. Pat. No. 5,432,821 issued Jul. 11, 1995 based on a patent application serial No. 985,004 filed Dec. 2, 1992, dealt only with scalar signal analysis of multipath extracted from a single antenna. (This patent is incorporated herein by reference and made a part hereof.) The prior work of Polydoros and Raheli failed to address vector processing and thus did not deal with inputs received from multiple antennas.

SUMMARY OF THE INVENTION

According to the invention, a method and a system are provided which uses vector per-survivor processing (PSP) on the outputs of an array of antennas of arbitrary geometry to jointly estimate angles of arrival of multipath components of the transmitted data sequence (i.e., the modulated data signal) while extracting an estimate of the modulated data. The system includes an antenna array of arbitrary geometry (i.e., arbitrary spacing between elements, directional, omnidirectional, etc.), each element of which has its output applied to a corresponding matched filter. The matched filter outputs in turn are sampled and applied to a vector-type PSP engine, wherein the vector PSP engine computes an estimate of the channels between the transmitter antenna and the receiver antenna elements to construct a channel estimation matrix. Angle of arrival estimates of each of the multipath components are extracted from the channel estimation matrix for the best survivor. An estimate of the transmitted data sequence is also extracted based on the best survivor. The PSP engine performs its function in the form of equations that solve for the vector estimates of complex channels, where the channel models include multipath angles of arrival.

PSP offers superior performance as compared to "classical" adaptive antenna processing architectures where the spatial aspects are processed separately from the data. Further the PSP is implemented using straightforward digital signal processing hardware and thus lends itself to less complex and less expensive systems.

PSP is particularly well suited for array processing problems because it can deal in parallel with multiple channel uncertainties and different types of channel uncertainty (including angle of arrival (AOA)) and thereby derive a more optimal solution. In addition it accommodates time varying channels (whether due to geometry, transmitter movement, interference or noise) as part of the inherent processing. Furthermore, PSP can accomplish this without the use of any training sequence, as will be hereinafter evident.

This invention was developed in the course of research leading to the Ph.D. dissertation of the present inventor entitled MODULATION CLASSIFICATION AND DATA DETECTION OF SIGNALS IN UNKNOWN ISI ENVIRONMENTS, first published Sep. 20, 1996 (Copyright Registration No. TX 4-417-419). Specifically in Section 4.2.1.1 and in Appendix D, the inventor describes the application of Per-Survivor Processing (PSP) using multiple antennas for analyzing multipath. That work is the subject of the present patent application. PSP is a radical departure from current conventional thinking on adaptive array processing. This invention is believed to be the first implementation of vector PSP in any application.

The invention will be better understood by reference to the following detailed description in connection with the accompanying drawings.

DESCRIPTION OF SPECIFIC EMBODIMENTS

Figure 1:
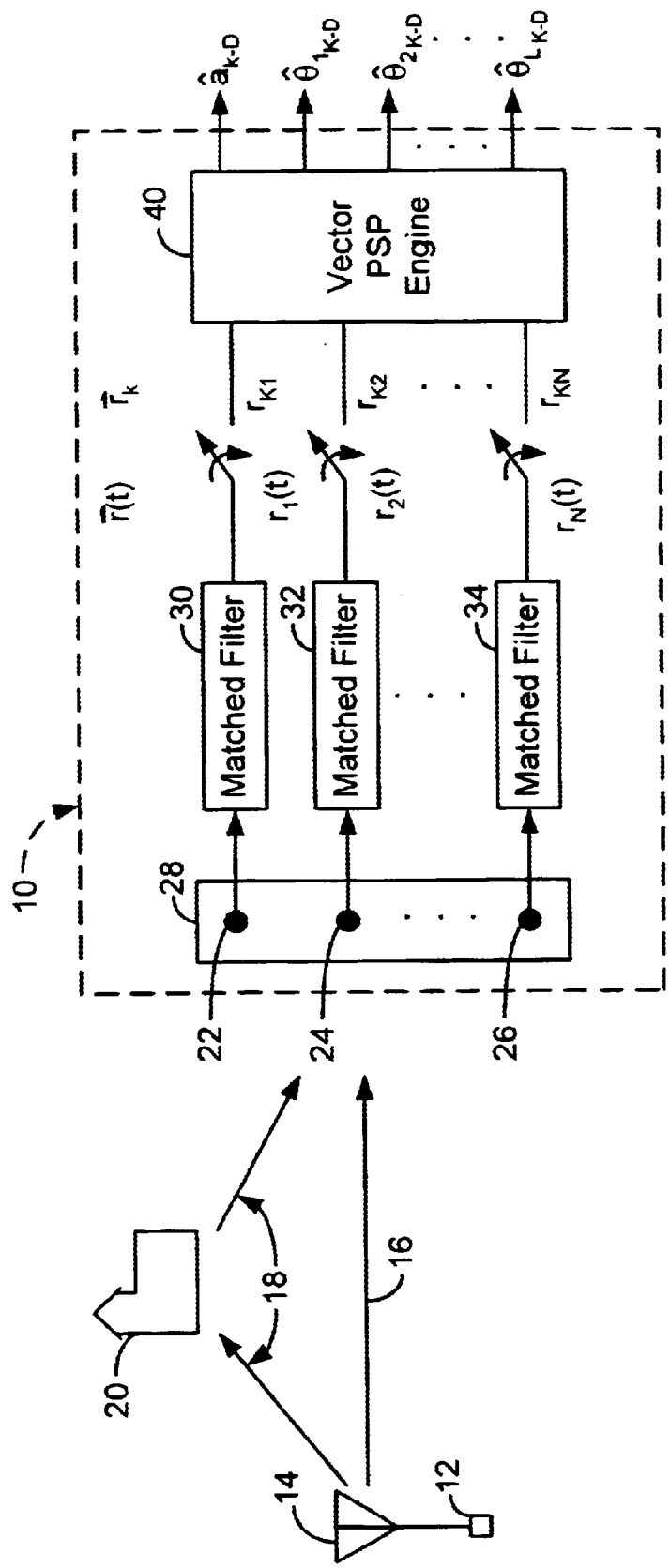
FIG. 1 is a block diagram of a system according to the invention.

Referring to FIG. 1, the invention is illustrated in a multipath environment. A receiver 10 is disposed to receive signals from a transmitter 12 emanating from an antenna 14 via a direct path 16 and a reflected path 18, as might be caused by a building 20. The signal 16, is typically produced by a digitally-modulated signal of arbitrary modulation. The composite of components 16 and 18 received at the antenna elements exhibits intersymbol interference due to a multipath channel profile. Each multipath signal component impinges on all elements 22, 24, . . . , 26, of an antenna array 28. Each of the antenna elements 22, 24, . . . , 26 operates as an independent antenna. The individual signals are passed through a bank of parallel matched filters 30, 32, . . . , 34 to yield a vector r(t) consisting of scalar signals $r_1(t), r_2(t), \ldots, r_N(t)$. The parallel matched filters 30, 32, . . . , 34 have a transfer characteristic matched to the pulse shape of the symbol generated at the data modulator of the transmitter without regard to the channel transfer characteristic. The outputs of the matched filters 30, 32, . . . , 34 in this embodiment are sampled at the symbol rate of the transmitter to produce a sampled data vector $r_k$ in the discrete time domain consisting of the scalar quantities, at each sample time k, namely, $r_{k1}, r_{k2}, \ldots, r_{kN}$. In a specific embodiment, the discrete time domain is expected to be fully digital.

According to the invention the sampled data vector $r_k$ is processed through a vector-type per-survivor processing (PSP) engine 40 to yield an estimate of the transmitted data sequence $\hat{a}_k$ while at the same time yielding an estimate of the angle of arrival of all multipath components $\hat{\theta}_1, \hat{\theta}_2, \ldots, \hat{\theta}_L$ of the received signal. The vector PSP engine is an improvement over the PSP engine of the prior work of Polydoros et al.

Figure 2:
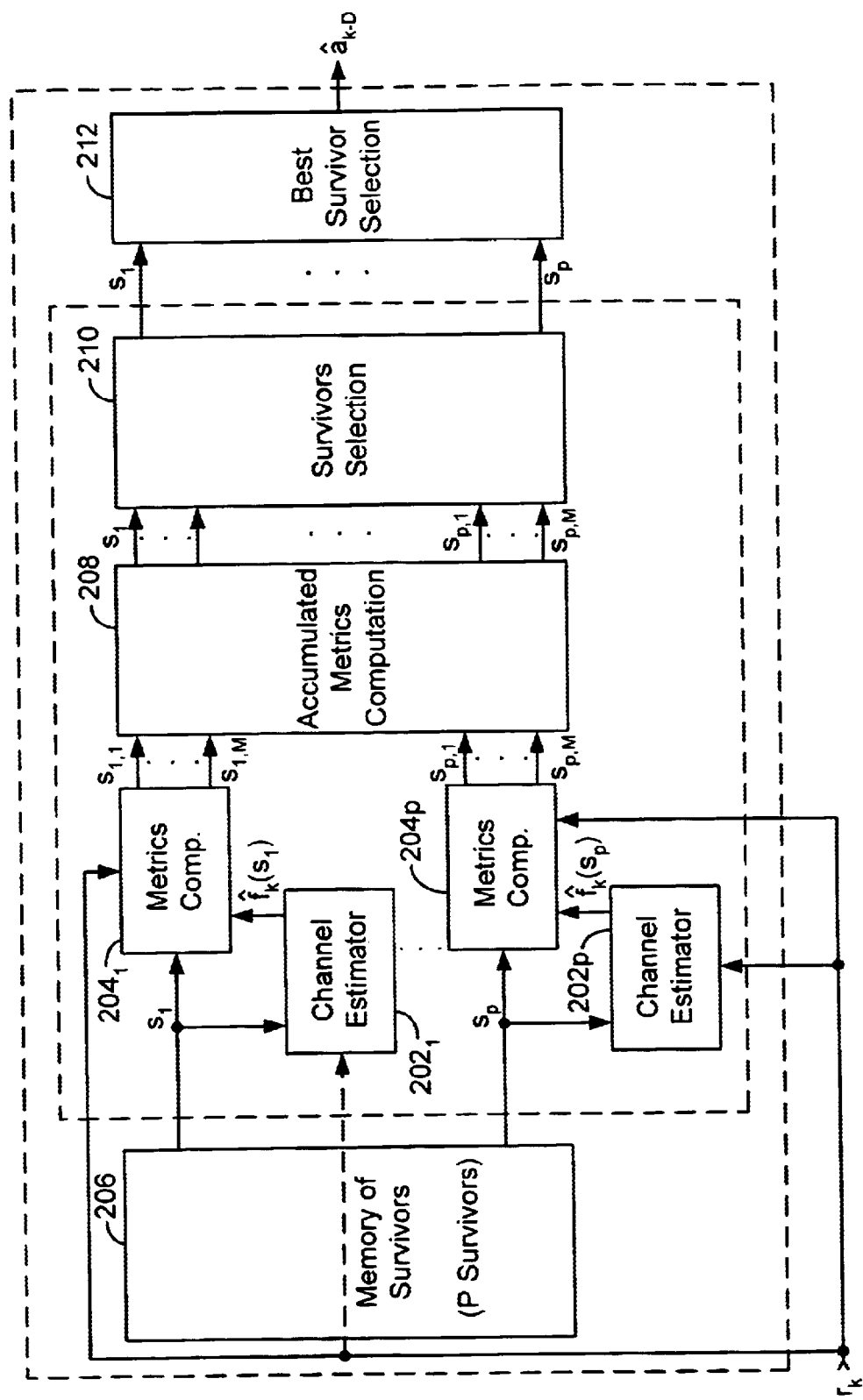
FIG. 2 is a block diagram of a prior art element in a system.

FIG. 2 is an illustration of a prior art scalar PSP engine as first disclosed by Polydoros et al. in U.S. Pat. No. 5,432,821, incorporated herein by reference. (Indexes have been changed in this disclosure of the Polydoros patent to be compatible with the present disclosure.) Therein a separate channel estimator 202 and metrics comparator 204 are provided for each survivor $S_1, \ldots, S_P$, as explained therein. In Polydoros et al., a survivor value is a multiparameter value representing the guess at the best path to a node in a trellis at a given point in time which constitutes a hypothesized transmit data sequence $a_k$. There is at least one survivor for each node. Specifically, the survivor value $S_n$ represents a hypothesized transmitted data sequence $a_k$ for the associated survivor plus the accumulated error metric for that survivor. In Polydoros, the channel estimators are at most a vector. Thus, the channel estimators estimate a channel assuming there is only one signal source.

Figure 3:
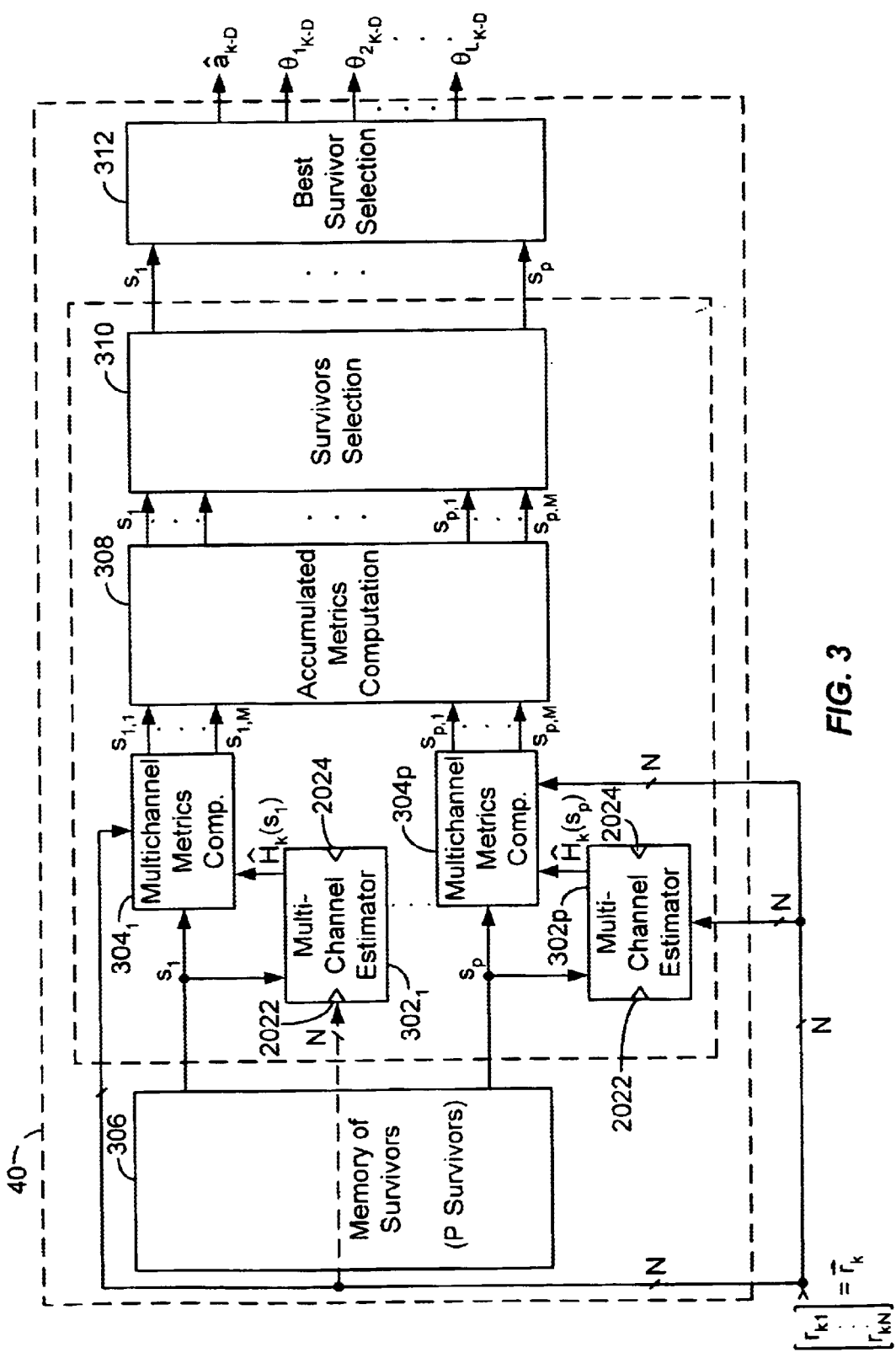
FIG. 3 is a block diagram of an element according to the invention.

Referring to FIG. 3, the vector PSP engine 40 according to the invention is shown. For each of P survivors the vector $r_k$ representing the multielement scalar values $r_{k1}$ to $r_{kN}$ at time k is applied to a multichannel estimator 302 to produce an updated matrix estimate $\hat{H}_{k+1}$ (one per survivor). The previous matrix estimate $\hat{H}_k$ is applied with the vector $r_k$ to a multichannel metrics comparator 304. The matrix estimate $\hat{H}_k$ is multiplied by the input vector to produce an estimate of the received data vector $\hat{r}_k$. In the metrics comparator 304, an error value is computed between the estimate $\hat{r}_k$ and the received vector $r_k$ from which the best path can be computed. The metrics comparator 304 propagates the input survivor S to the allowable plurality of survivor paths $S_1$ to $S_N$. together with the error metric associated therewith. This vector of data structures comprising scalars and vectors is propagated by the accumulated metrics computation 308 to a survivors selection function 310. The best set of survivors $S_1$ to $S_P$ for each stage of the trellis is applied to the best survivors selection function 312 which examines the data on the best path as of D symbol times earlier and identifies it as the estimate of the data sequence $\hat{a}_{k-D}$. (This is a form of delayed decision decoding.)

In addition, according to the invention, the best survivors selection function 312 also yields the angles of arrival at time D symbol times earlier for that best survivor. These values are useful for position location and exploitation of that information to improve signal to noise.

In the present invention, the channel estimators are each arrays, and the survivor value is a multiparameter value which includes not only the hypothesized transmitted data sequence $a_k$ and the accumulated error metric for the path, but also the sequence of estimated angles of arrival of all multipath components $\hat{\theta}_1, \hat{\theta}_2, \ldots, \hat{\theta}_L$ for that survivor. The sequence of estimated angles of arrival is the set of estimates at each time k.

The foregoing explanation is useful for understanding the dataflow of a system according to the invention. Many embodiments are contemplated, including digital processing that takes advantage of the inherent characteristics of information storage and computation elements for performing the tasks outlined above.

The following provides a more rigorous explanation of the multichannel estimation processing according to the invention.

A narrowband channel model is presented below (Eq. 1) for a discrete time signal affected by multipath which is received by an antenna array. The model can be reasonably invoked when the signal propagation time delay between array elements is negligible compared to the inverse of the signal bandwidth. In this model, the presence of multipath is treated as spatially discrete (i.e., having different angles-of-arrival) signals with sufficient time discrimination between paths to produce independence between components. The actual received array signal vector, $r_k$, at time k is then given by the following:

$$r_k = \begin{bmatrix} r_{k1} \\ r_{k2} \\ \vdots \\ r_{kN} \end{bmatrix} = \underbrace{\begin{bmatrix} h_0 & h_1 & \cdots & h_{L-1} \\ h_0 f_1(\theta_0) & h_1 f_1(\theta_1) & \cdots & h_{L-1} f_1(\theta_{L-1}) \\ \vdots & & & \vdots \\ h_0 f_{N-1}(\theta_0) & h_1 f_{N-1}(\theta_1) & \cdots & h_{L-1} f_{N-1}(\theta_{L-1}) \end{bmatrix}}_{H} \quad \text{(Eq. 1)}$$

$$\underbrace{\begin{bmatrix} a_k \\ a_{k-1} \\ \vdots \\ a_{k-L+1} \end{bmatrix}}_{a_k} + \begin{bmatrix} n_{k1} \\ n_{k2} \\ \vdots \\ n_{kN} \end{bmatrix}$$

where:
$r_k$ is the received array signal vector at time k,
$r_{ki}$ is the scalar received at antenna i at time k,
$h_j$ is a scalar that accounts for strength and relative phase of the jth multipath component of the received signal,
$\theta_j$ is the received angle of arrival of the jth multipath component,
$a_k$ is the transmitted data sequence from time k−L+1 to k.
$n_{ki}$ is the noise on antenna i at time k, The L multipath coefficients are represented by $h_l$, l=0 . . . L−1, and the data sequence spanning the channel duration is given by $a_k, \ldots, a_{k-L+1}$. The additive noise associated with the ith element, $n_{ki}$, is modeled as white Gaussian noise which is also independent between elements.

Assume N elements within the array, resulting in the functions $f_l(\theta j)$, l=1 . . . N−1. The functions f represent the electrical phase induced by multipath component j impinging upon the antenna array 28 (FIG. 1) at angle θj. The electrical phase is determined by the array geometry, i.e., spacing between elements 22, 24, . . . , 26 of the antenna array 28 and the angle of arrival θj. For a linear antenna array 28 with elements 22, 24, . . . , 26 spaced at intervals of one-half wavelength, these functions are given by the following:

$$f_l(\theta_j) = \exp\left[i \cdot l \cdot \frac{2\pi D}{\lambda} \sin(\theta_j)\right] = \exp[i \cdot l \cdot \pi \sin(\theta_j)], \quad \text{(Eq. 2)}$$

$$\text{where } D = \frac{\lambda}{2}$$

and where i is $\sqrt{-1}$.

The zeroeth element of the array provides a reference phase for the remaining elements. Hence, it contributes no additional phase to the received signal due to the signal angle-of-arrival.

The vector PSP approach utilizes a channel estimate matrix $\hat{H}$:

$$\begin{bmatrix} \hat{h}_0 & \hat{h}_1 & \cdots & \hat{h}_{L-1} \\ \hat{h}_0 f_1(\hat{\theta}_0) & \hat{h}_1 f_1(\hat{\theta}_1) & \cdots & \hat{h}_{L-1} f_1(\hat{\theta}_{L-1}) \\ \vdots & & & \vdots \\ \hat{h}_0 f_{N-1}(\hat{\theta}_0) & \hat{h}_1 f_{N-1}(\hat{\theta}_1) & \cdots & \hat{h}_{L-1} f_{N-1}(\hat{\theta}_{L-1}) \end{bmatrix} \quad \text{(Eq. 3)}$$

A vector PSP formulation utilizing a Least Means Squares algorithm (LMS)-based channel estimation process that includes a separate parameter estimator for angle of arrival is given by the following pair of equations. Both channel and angle of arrival estimators are provided which comprise multiple estimates, each associated with a specific data sequence that has been retained in the data estimation process.

$$\begin{bmatrix} \hat{h}_0 \\ \hat{h}_1 \\ \vdots \\ \hat{h}_{L-1} \end{bmatrix} = \hat{h}(\mu_k) = \hat{h}(\mu_{k-1}) - \beta_h \cdot \nabla_{\hat{h}} \quad \text{(Eq. 4, 5)}$$

$$\begin{bmatrix} \hat{\theta}_0 \\ \hat{\theta}_1 \\ \vdots \\ \hat{\theta}_{L-1} \end{bmatrix} = \hat{\theta}(\mu_k) = \hat{\theta}(\mu_{k-1}) - \beta_\theta \nabla_{\hat{\theta}}$$

where the scalar values $\hat{h}_j$ are the scalar estimates of the complex coefficients of the estimate of the channel coefficient vector, and the scalar values $\hat{\theta}_j$ are the scalar components of the estimated angle of arrival vector, the β terms are LMS adaptation constants, and the μ terms are the receiver state description at time k for the specific survivor. There is thus an h and a θ for each survivor.

The selection of individual step sizes, $\beta h$ and $\beta_\theta$, may be governed by conventional approaches associated with the LMS algorithm. Typically, the magnitude of the step size represents a tradeoff between speed of convergence and steady-state misadjustment error. The gradients in the above equations require computation during each iteration of the estimation update and are defined by the following gradient equation. The data variables, $a_k$, are not explicitly identified as estimates because this gradient calculation is conditioned upon a specific data sequence that can be identified by examining the data estimates associated with a survivor and associated with the receiver state description, $\mu k$.

$$\nabla_{\hat{h}}(\|r_k - \hat{H} \cdot a_k\|^2) = \quad \text{(Eq. 6)}$$

$$2 \sum_{j=0}^{N-1} \begin{bmatrix} a_k^* f_j^*(\hat{\theta}_0) \cdot \left(\sum_{l=0}^{L-1}(a_{k-l}\hat{h}_l f_j(\hat{\theta}_l)) - r_{k,j+1}\right) \\ a_{k-1}^* f_j^*(\hat{\theta}_1) \cdot \left(\sum_{l=0}^{L-1}(a_{k-l}\hat{h}_l f_j(\hat{\theta}_l)) - r_{k,j+1}\right) \\ \vdots \\ a_{k-L+1}^* f_j^*(\hat{\theta}_{L-1}) \cdot \left(\sum_{l=0}^{L-1}(a_{k-l}\hat{h}_l f_j(\hat{\theta}_l)) - r_{k,j+1}\right) \end{bmatrix}$$

$$\nabla_{\theta}(\|r_k - \hat{H} \cdot a_k\|^2) = \quad \text{(Eq. 7)}$$

$$2 \sum_{j=0}^{N-1} \begin{bmatrix} \Re\left\{a_k^* \hat{h}_0^* \frac{\partial f_j(\hat{\theta}_0)}{\partial \hat{\theta}_0} \cdot \left(\sum_{l=0}^{L-1}(a_{k-l}\hat{h}_l f_j(\hat{\theta}_l)) - r_{k,j+1}\right)\right\} \\ \Re\left\{a_{k-1}^* \hat{h}_1^* \frac{\partial f_j(\hat{\theta}_1)}{\partial \hat{\theta}_1} \cdot \left(\sum_{l=0}^{L-1}(a_{k-l}\hat{h}_l f_j(\hat{\theta}_l)) - r_{k,j+1}\right)\right\} \\ \vdots \\ \Re\left\{a_{k-L+1}^* \hat{h}_{L-1}^* \frac{\partial f_j(\hat{\theta}_{L-1})}{\partial \hat{\theta}_{L-1}} \cdot \left(\sum_{l=0}^{L-1}(a_{k-l}\hat{h}_l f_j(\hat{\theta}_l)) - r_{k,j+1}\right)\right\} \end{bmatrix}$$

where the terms are as previously defined and $\Re\{x\}$ represents the real portion of x. The gradients above are L by 1 where L represents the number of multipath components in the model.

Finally, although $f_1(\theta j)$ is functionally modeled above, it is far more typical to obtain it as a result of an antenna array calibration process. In that event, the partial derivatives of the gradient computations should simply be replaced with finite differences calculated from the discrete calibration data.

Performance results demonstrate the ability of vector based PSP to estimate angle-of-arrival parameters. The simulation scenarios employ a two sensor array with a λ/2 element spacing. The baud-spaced multipath channel impulse response consists of the following coefficient sequence:

[−0.205 −0.513 0.718 0.369 0.205].

In addition, the different delayed signal components are assumed to originate from discrete, azimuths corresponding to angles of arrival of −60, 20, 45, 70 and −14 degrees.

The system begins without knowledge of channel coefficients. In the performance simulation results illustrated, the channel coefficients were initialized to the all pass channel:

($h_{init}$=[0.0 0.0 1.0 0.0 0.0]).

The initial angles of arrival were set to zero degrees.

Figure 4:
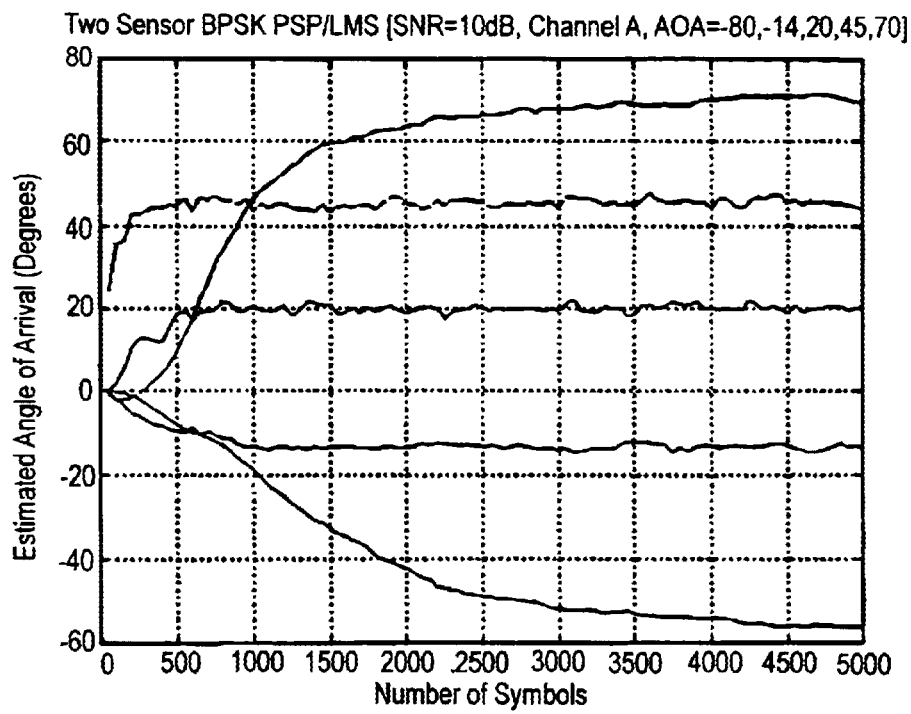
FIG. 4 is a graphic of angle of arrival acquisition performance at a 10 dB signal to noise ratio.
Figure 5:
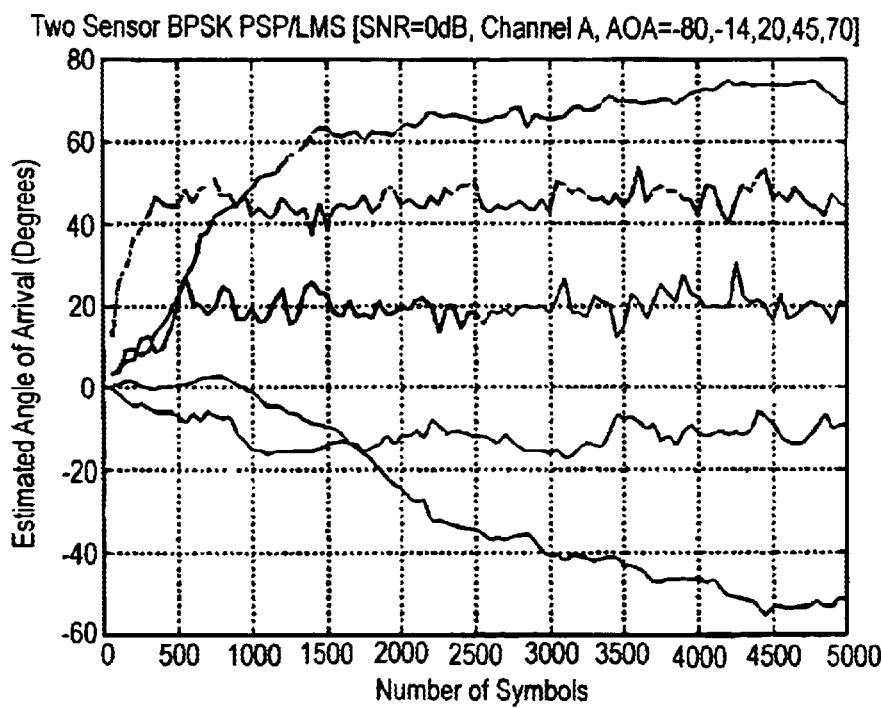
FIG. 5 is a graphic of angle of arrival acquisition performance at a 0 dB signal to noise ratio.

FIGS. 4 and 5 illustrate the results. The received, per array-element SNR is at 10 dB in FIG. 4 and at 0 dB in FIG. 5. Blind acquisition (i.e., acquisition with no training sequence) results are shown for a 5000 symbol time series. Convergence of the 20 and 45 degree AOA components, which represents 78% of the total received signal energy, occurs fairly quickly—within 500 symbols, for both cases. The remaining multipath component angle estimates exhibit longer convergence times.

Two significant points are noteworthy. First, vector PSP provides a capability for estimating direction of arrival information for multiple independent signals (multipath) even when the number of array elements is fewer than the number of signals. Second, robust AOA estimation is achievable (i.e., reliable AOA information is available) at signal to noise ratios below reliable data detection thresholds, such as the 0 dB case of FIG. 5.

The invention has now been explained with reference to specific embodiments. Other embodiments will be apparent to those of ordinary skill in the art. It is therefore not intended that this invention be limited, except as defined by the appended claims.

What is claimed is:

1. A method for estimating a transmitted data sequence based on an actual received signal vector and for estimating respective angles of arrival comprises:

receiving multipath components of a digitally-phase-modulated signal at an array of antennas of arbitrary geometry to produce the actual received signal vector of received components from the array of antennas;

sampling the received components of the actual received signal vector at regular symbol times to produce an actual sampled received signal vector; and applying vector per-survivor processing to the actual sampled received signal vector to yield an estimate of the transmitted data sequence and an estimated angle of arrival of each of the multipath components of the digitally-phase-modulated signal.

2. The method according to claim 1 wherein said vector per-survivor processing step comprises:

multiplying components of a channel estimation matrix comprising scalar values representing multipath components for each of the antennas by a corresponding coefficient of a hypothesized transmitted data sequence for a surviving path to produce the estimate of the sampled received signal vector;

comparing the estimate of the sampled received signal vector with the actual sampled received signal vector to yield an error term;

selecting as the best surviving path that path with the minimum accumulated error metric as determined by the error term;

updating the channel estimation matrix using the error term;

reporting the hypothesized transmitted data sequence for selected best surviving path; and reporting selected parameters in the channel estimation matrix comprising the estimated angle of arrival for each of the multipath components.

3. The method according to claim 2 wherein the updating step comprises:

computing a coefficient gradient estimation vector with respect to each received power and phase coefficient; and subtracting said coefficient gradient estimation vector as weighted by a scaling coefficient from the current estimate of the coefficient vector to obtain an updated estimate of the coefficient vector.

4. The method according to claim 3 wherein the updating step further includes the steps of:

computing a gradient estimation vector with respect to each angle of arrival component;

subtracting said angle gradient estimation vector as weighted by a scaling coefficient from the current estimate of the angle of arrival vector to obtain an updated estimate of the angle of arrival vector; and combining the updated estimate of the coefficient vector and the updated estimate of the angle of arrival vector to obtain an updated channel estimation matrix.

5. The method according to claim 1 wherein the step of applying vector per-survivor processing to the actual sampled received signal vector comprises:

calculating the estimate of the transmitted data sequence and the estimated angle of arrival substantially simultaneously; and calculating the estimated angle of arrival in response to the estimate of the transmitted data.

6. A system for estimating a transmitted data sequence based on an actual received signal vector for estimating angles of arrival of multipath components of the actual received signal vector comprises:

an array of antennas of arbitrary geometry receiving multipath components of a digitally-phase-modulated signal of a digital transmission to produce the actual received signal vector of received components from the array of antennas;

sampling circuitry for sampling the received components of the actual received signal vector at regular symbol times to produce an actual sampled received signal vector; and a vector per-survivor processor for processing the actual received signal vector to yield an estimate of the transmitted data sequence and an estimated angle of arrival of each of the multipath components of the digitally-phase-modulated signal.

7. The system according to claim 6 wherein said vector per-survivor processor comprises:

a matrix multiplier for multiplying components of a channel estimation matrix comprising scalar values representing multipath components for each of the antennas by a corresponding coefficient of a hypothesized transmitted data sequence for a surviving path to produce the estimate of the sampled received signal vector;

comparators for comparing the estimate of the sampled received signal vector with the actual sampled received signal vector to yield an error term;

a best surviving path selector for selecting as the best surviving path that path with the minimum accumulated error metric as determined by the error term;

updating means for updating the channel estimation matrix using the error term;

output means for reporting the hypothesized transmitted data sequence for selected best surviving path; and output means for reporting selected parameters in the channel estimation matrix comprising an estimated angle of arrival for each of the multipath components.

8. The system according to claim 5 wherein the updating means comprises:

means for computing a coefficient gradient estimation vector with respect to each received power and phase coefficient; and means for subtracting said coefficient gradient estimation vector as weighted by a scaling coefficient from the current estimate of the coefficient vector to obtain an updated estimate of the coefficient vector.

9. The system according to claim 6 wherein the updating moans further includes:

means for computing a gradient estimation vector with respect to each angle of arrival component;

means for subtracting said angle gradient estimation vector as weighted by a scaling coefficient from the current estimate of the angle of arrival vector to obtain an updated estimate of the angle of arrival vector; and means for combining the updated estimate of the coefficient vector and the updated estimate of the angle of arrival vector to obtain an updated channel estimation matrix.

10. The system according to claim 6 where the vector per-survivor processor calculating the estimate of the transmitted data sequence and the estimated angle of arrival substantially simultaneously, and calculating the estimated angle of arrival in response to the estimate of the transmitted data.

* * * * *